UNITED STATES PATENT OFFICE.

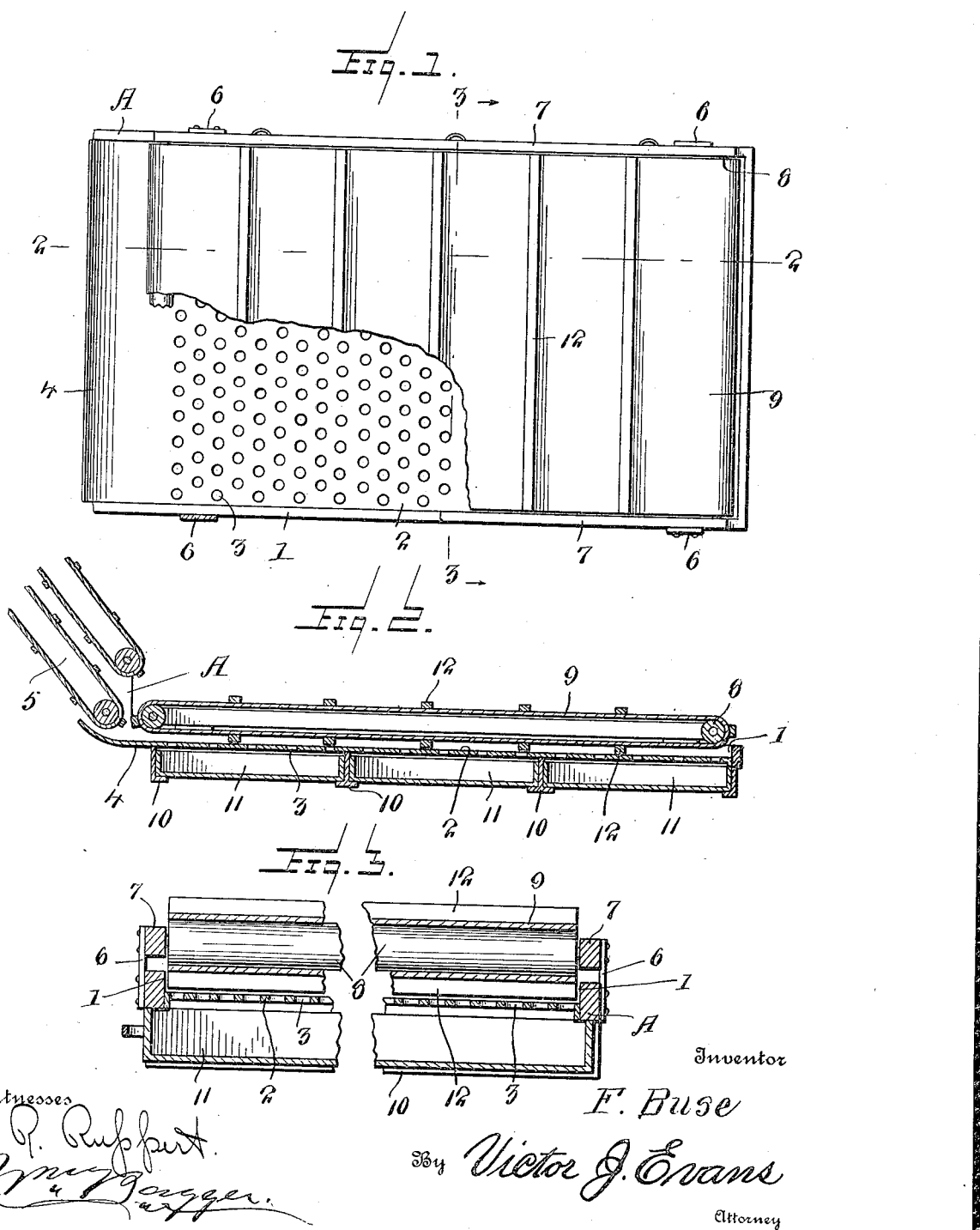

FRITZ BUSE, OF TERRA NOVA, LULU ISLAND, BRITISH COLUMBIA, CANADA.

GRAIN-SAVING DEVICE.

1,143,503.  Specification of Letters Patent.  Patented June 15, 1915.

Application filed January 3, 1913. Serial No. 740,019.

*To all whom it may concern:*

Be it known that I, FRITZ BUSE, a citizen of the United States, residing at Terra Nova, Lulu Island, in the Province of British Columbia and Dominion of Canada, have invented new and useful Improvements in Grain-Saving Devices, of which the following is a specification.

This invention relates to harvesters and binders, and its principal object is to provide a grain saving device or attachment of simple and improved construction.

A further object of the invention is to provide the grain platform with a perforated floor and with a series of receptacles arranged beneath the floor to receive shelled grain that would otherwise be wasted.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—Figure 1 is a top plan view of a grain platform constructed in accordance with the invention, a portion of the apron having been removed in order to expose subjacent parts. Fig. 2 is a sectional view of the grain platform taken on the line 2—2 in Fig. 1, said view showing also a portion of the elevating carrier. Fig. 3 is a sectional detail view taken on the line 3—3 in Fig. 1.

Corresponding parts in the several figures are denoted by like characters of reference.

The grain platform includes a frame A which is provided along its front, rear and outer edges with upstanding flanges 1. The frame supports a floor member 2 which is provided with numerous apertures 3 of ample size to permit shelled grain to pass freely therethrough. The floor member has an imperforate arcuate extension 4 that projects beneath the elevating carrier 5 of the binder.

The platform frame is provided at its front and rear edges with upstanding brackets 6 supporting cleats 7 that afford bearings for the roller shafts 8 over which the endless carrier 9 of the platform is guided. The frame is provided beneath the floor 2 with cleats 10 supporting a plurality of longitudinally slidable drawers or receptacles 11 which are provided at their rear ends with handles to enable them to be conveniently emptied and replaced. The cutting apparatus which is not shown may be mounted on the platform in any convenient manner and customary well known means are to be provided for driving the carriers 5 and 9.

It will be readily understood that shelled grain that drops from the ears on the platform carrier 9 will be thereby conveyed to the floor extension 4 upon which it will be deposited. Shelled grain detached from the ears in transit over the elevating carrier will slide downward over the floor of the latter and will likewise be deposited on the floor extension 4. From said floor extension the shelled grain will be raked by the slats 12 of the platform carrier 9 over the apertured floor and will drop through the latter into the receptacles 11 from which it may be subsequently removed.

By this simple device it will be seen that much grain that would otherwise be lost is saved for the producer.

The improved grain saving device is simple in construction, easily applied to or installed on any grain binding harvester of ordinary construction, and it may be produced and applied at a very moderate expense.

Having thus described the invention, what is claimed as new, is:—

A grain saving device for grain binders comprising, in combination with an elevating conveyer, a platform frame, an apertured floor on said frame having an imperforate arcuate portion extending at one side beneath and overhung by the elevating carrier, upstanding flanges at the other three sides of the frame, an endless carrier supported above the floor and having slats contacting with the apertured floor, cleats beneath the apertured floor, and grain receiving drawers slidably supported on the cleats and capable of being removed for emptying the contents.

In testimony whereof I affix my signature in presence of two witnesses.

FRITZ BUSE.

Witnesses:
J. B. COLVARD,
G. C. WOODWARD.

Copies of this patent may be obtained for five cents each, by addressing the "Commissioner of Patents, Washington, D. C."